US011300507B2

(12) United States Patent
Xu et al.

(10) Patent No.: US 11,300,507 B2
(45) Date of Patent: Apr. 12, 2022

(54) OPTICAL MEASUREMENT DEVICE AND METHOD

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Hongqiao Xu, Beijing (CN); Qiang Huang, Beijing (CN); Shufeng Wang, Beijing (CN); Jinbo Xu, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 482 days.

(21) Appl. No.: 16/332,648

(22) PCT Filed: Jun. 1, 2018

(86) PCT No.: PCT/CN2018/089593
§ 371 (c)(1),
(2) Date: Mar. 12, 2019

(87) PCT Pub. No.: WO2018/223903
PCT Pub. Date: Dec. 13, 2018

(65) Prior Publication Data
US 2021/0285875 A1 Sep. 16, 2021

(30) Foreign Application Priority Data
Jun. 5, 2017 (CN) .................. 201710414314.X

(51) Int. Cl.
*G01N 21/63* (2006.01)
*G01N 21/01* (2006.01)
*G02F 1/13* (2006.01)

(52) U.S. Cl.
CPC ............ *G01N 21/63* (2013.01); *G01N 21/01* (2013.01); *G02F 1/1309* (2013.01); *G01N 2021/0106* (2013.01); *G01N 2201/025* (2013.01)

(58) Field of Classification Search
CPC .......... G01N 2021/0106; G01N 21/01; G01N 21/63; G01N 2201/025; G01N 2021/9513; G02F 1/1309; G01B 11/022; G01B 11/026

(Continued)

(56) References Cited

U.S. PATENT DOCUMENTS 2,003,806 A * 6/1935 Lee .......................... A61B 3/00
351/244

FOREIGN PATENT DOCUMENTS

CN 2890902 Y 4/2007
CN 103654835 A 3/2014

(Continued)

OTHER PUBLICATIONS

International Search Report dated Sep. 11, 2018 issued in corresponding International Application No. PCT/CN2018/089593.

(Continued)

*Primary Examiner* — Sunghee Y Gray
(74) *Attorney, Agent, or Firm* — Nath, Goldberg & Meyer; Joshua B. Goldberg

(57) ABSTRACT

An optical measurement device and an optical measurement method are provided. The optical measurement device includes a test backplane, a light emitter, a center point detector and a movement device. The movement device is provided on the test backplane, and configured to carry a to-be-tested sample. The light emitter is configured to display a first center point on the to-be-tested sample, and the first center point corresponds to a center point of the test (Continued)

backplane. The center point detector is configured to detect a second center point and display the second center point on the to-be-tested sample, and the second center point is a center point of the to-be-tested sample. The movement device is further configured to move the to-be-tested sample, such that the first center point and the second center point coincide with each other.

20 Claims, 3 Drawing Sheets

(58) Field of Classification Search
USPC .......................................................... 356/36
See application file for complete search history.

(56) References Cited

FOREIGN PATENT DOCUMENTS

| | | |
|---|---|---|
| CN | 103676284 A | 3/2014 |
| CN | 103957060 A | 7/2014 |
| CN | 204116744 U | 1/2015 |
| CN | 105527464 A | 4/2016 |
| CN | 106990573 A | 7/2017 |
| JP | H8-234226 A | 9/1996 |

OTHER PUBLICATIONS

Office Action dated May 24, 2019 issued in corresponding Chinese Application No. 201710414314.X.

* cited by examiner

OPTICAL MEASUREMENT DEVICE AND METHOD

CROSS-REFERENCE TO RELATED APPLICATIONS

This is a National Phase Application filed under 35 U.S.C. 371 as a national stage of PCT/CN2018/089593, filed Jun. 1, 2018, an application claiming the benefit of Chinese Patent Application No. 201710414314.X, filed on Jun. 5, 2017, the contents of which are incorporated herein in their entirety by reference.

TECHNICAL FIELD

The present disclosure relates to an optical field, and in particular, relates to an optical measurement device and an optical measurement method.

BACKGROUND

Liquid crystal display panels are widely applied to high-definition digital televisions, desktop computers, notebook computers, mobile phones, digital cameras and other electronic devices due to their advantages such as light weight, energy saving, no radiation, and the like. At present, each liquid crystal display panel must be subjected to an optical test before leaving the factory, and qualified products passing the optical test may be handled in subsequent production processes. In general, a known module optics management system (also referred to as FPMS) may be employed to perform the optical test on each liquid crystal display panel.

SUMMARY

Embodiments of the present disclosure provide an optical measurement device and an optical measurement method.

Some embodiments of the present disclosure provide an optical measurement device, which includes a test backplane, a light emitter, a center point detector and a movement device, wherein the movement device is provided on the test backplane, and configured to carry a to-be-tested sample; the light emitter is configured to display a first center point on the to-be-tested sample, and the first center point corresponds to a center point of the test backplane; the center point detector is configured to detect a second center point and display the second center point on the to-be-tested sample, and the second center point is a center point of the to-be-tested sample; and the movement device is further configured to move the to-be-tested sample, such that the first center point and the second center point coincide with each other.

In an embodiment, the center point detector is configured to detect size information of the to-be-tested sample, calculate position information of the second center point according to the size information, and emit light towards the to-be-tested sample according to the position information of the second center point, so as to display the second center point on the to-be-tested sample.

In an embodiment, the optical measurement device further includes a vacuum suction device provided on the test backplane, wherein the vacuum suction device is configured to, after the first center point and the second center point coincide with each other, adsorb and fix the to-be-tested sample to the test backplane.

In an embodiment, the movement device includes first supports and second supports, the to-be-tested sample is provided on the first supports, and the first supports are provided on the second supports; wherein the first supports are configured to move in a second direction, so as to drive the to-be-tested sample to move in the second direction; and the second supports are configured to move in a first direction, so as to drive the first supports to move in the first direction, such that the to-be-tested sample is moved in the first direction, the first direction and the second direction being arranged to cross each other.

In an embodiment, a number of the first supports is two, and the two first supports are arranged parallel to each other.

In an embodiment, the optical measurement device further includes four fixing structures, wherein two of the four fixing structures are provided on one of the first supports, and the remaining two of the four fixing structures are provided on the other of the first supports; and each corner portion of the to-be-tested sample is arranged on a corresponding one of the fixing structures, such that the to-be-tested sample is arranged on the first supports.

In an embodiment, a distance between two fixing structures on each of the first supports is set according to a size of the to-be-tested sample.

In an embodiment; a distance between the two first supports is set according to a size of the to-be-tested sample.

In an embodiment, a number of the second supports is two, and the two second supports are arranged parallel to each other.

In an embodiment, the optical measurement device further includes a test instrument and a test-instrument support, wherein the light emitter is located inside the test instrument, and the center point detector is located on the test instrument; and the test instrument is located on the test-instrument support.

In an embodiment, the optical measurement device further includes a bottom turnplate and an equipment support, wherein the test backplane is provided on the equipment support, and the equipment support is provided on the bottom turnplate; and the bottom turnplate is configured to rotate in a horizontal plane around a rotation axis, to drive the test backplane to rotate in the horizontal plane, and both a center point of the bottom turnplate and the first center point are located on the rotation axis.

In an embodiment, the equipment support includes a first test-backplane support, a second test-backplane support, a third test-backplane support and a fourth test-backplane support which are connected to each other sequentially, wherein the fourth test-backplane support is perpendicular to the rotation axis; and the test backplane is configured to rotate in a vertical plane to drive the to-be-tested sample to rotate in the vertical plane.

In an embodiment, the optical measurement device further includes a test-backplane turnplate, wherein the test-backplane turnplate is provided between the test backplane and the fourth test-backplane support; and the test-backplane turnplate is configured to rotate in the vertical plane by taking the fourth test-backplane support as a rotation axis, to drive the test backplane to rotate in the vertical plane by taking the fourth test-backplane support as a rotation axis.

In an embodiment, the optical measurement device further includes a test-backplane fixing device, wherein an end of the test-backplane fixing device is arranged at a side of the test backplane distal to the to-be-tested sample, and another end of the test-backplane fixing device is arranged on the test-backplane turnplate; and the test-backplane fixing device is configured to fix the test backplane, to prevent the test backplane from sliding or swinging relative to the test-backplane turnplate.

In an embodiment, each of the fixing structures is an L-shaped bending structure, which has a contour matching with that of a corresponding corner portion of the to-be-tested sample.

In an embodiment, the test instrument is configured to perform an optical test on the to-be-tested sample to obtain optical parameters of the to-be-tested sample.

Embodiments of the present disclosure further provide an optical measurement method, which includes steps of: displaying a first center point on a to-be-tested sample by a light emitter, wherein the first center point corresponds to a center point of a test backplane; detecting a second center point and displaying the second center point on the to-be-tested sample by a center point detector, wherein the second center point is a center point of the to-be-tested sample; and moving the to-be-tested sample by a movement device, such that the first center point and the second center point coincide with each other.

In an embodiment, the step of detecting a second center point and displaying the second center point on the to-be-tested sample by a center point detector includes steps of: detecting size information of the to-be-tested sample by the center point detector; calculating position information of the second center point, by the center point detector, according to the size information; and emitting light towards the to-be-tested sample by the center point detector according to the position information of the second center point, so as to display the second center point on the to-be-tested sample.

In an embodiment, the optical measurement method further includes a step of: after the step of moving the to-be-tested sample by a movement device such that the first center point and the second center point coincide with each other, adsorbing and fixing the to-be-tested sample to the test backplane by a vacuum suction device.

In an embodiment, the optical measurement method further includes, after the step of adsorbing and fixing the to-be-tested sample to the test backplane by a vacuum suction device, steps of: causing the light emitter to stop displaying the first center point; causing the center point detector to stop displaying the second center point; starting up the to-be-tested sample; and performing an optical test on the to-be-tested sample.

DETAILED DESCRIPTION

To enable one of ordinary skills in the art to better understand technical solutions of the present disclosure, the technical solutions of the present disclosure will be clearly and fully described below with reference to the accompanying drawings. It is apparent that the described embodiments are only a part of embodiments of the present disclosure, but not exhaustive. All other embodiments obtained by one of ordinary skills in the art based on the embodiments described herein without any creative efforts also fall within the scope of the present disclosure.

The inventors of the present disclosure have found that, in the case of performing an optical test by using the known module optics management system FPMS, when installing a to-be-tested sample, a test personnel can only determine a position for installing the to-be-tested sample according to subjective judgment, and then a test instrument is moved to perform the optical test according to the position of the to-be-tested sample. Since the position for installing the to-be-tested sample is determined by the test personnel according to subjective judgment, there is usually a deviation of a center point of the to-be-tested sample from a center point of a test backplane (i.e., the center point of the to-be-tested sample and the center point of the test backplane do not coincide with each other). As a result, when optical parameters such as a viewing angle, a color shift and the like of the to-be-tested sample are subsequently tested, a test position of the to-be-tested sample will move relative to the test backplane as the test backplane moves, thereby causing results of the test to include a large error.

Therefore, it is desirable to provide technical solutions capable of achieving accurate coincidence of the center points of the to-be-tested sample and the test backplane, effectively reducing the error of the results of the optical test, and thereby increasing the accuracy of the results of the optical test.

Figure 1:
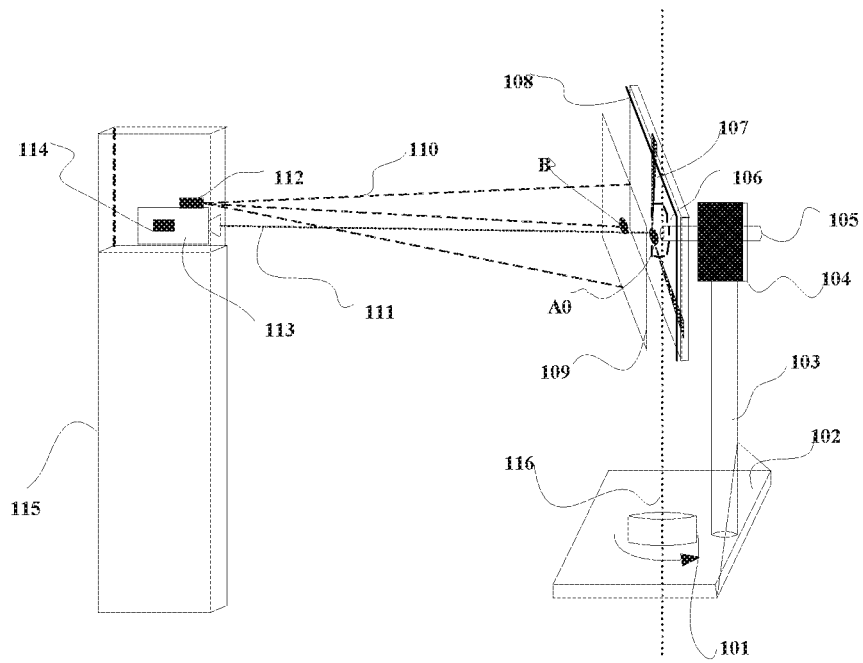
FIG. 1 is a schematic diagram showing a structure of an optical measurement device according to an embodiment of the present disclosure.

FIG. 1 is a schematic diagram showing a structure of an optical measurement device according to an embodiment of the present disclosure. As shown in FIG. 1, the optical measurement device includes a test backplane 108, a light emitter 114, a center point detector 112, and a movement device (see FIG. 3). The movement device is provided on the test backplane 108 (e.g., on a surface of the test backplane 108 proximal to the light emitter 114 and the center point detector 112), and configured to carry a to-be-tested sample 109. The light emitter 114 is configured to display a first center point A on the to-be-tested sample 109, and the first center point A corresponds to a center point (e.g., a geometric center point) A0 of the test backplane 108. The center point detector 112 is configured to detect a second center point B, and the second center point B is a center point (e.g., a geometric center point) of the to-be-tested sample 109. The movement device is configured to move the to-be-tested sample 109 such that the first center point A and the second center point B coincide with each other. In this embodiment, the to-be-tested sample 109 is located at a side of the test backplane 108 proximal to the light emitter 114 and the center point detector 112. In this embodiment, the to-be-tested sample 109 may include a liquid crystal display panel, a backlight, a complete machine, or another to-be-tested object having a relatively flat surface for being contact with the test backplane 108.

In the present embodiment, the center point A0 of the test backplane 108 may be determined and marked in advance, or may be determined in the same method as that for determining the second center point B as described below. The light emitter 114 is configured to emit light along a first optical path 111 to the center point A0 of the test backplane 108, to display the first center point A of the test backplane 108 on the to-be-tested sample 109. For example, the first center point A of the test backplane 108 is an intersection point of the to-be-tested sample 109 and the light emitted from the light emitter 114 along the first optical path 111 to the center point A0 of the test backplane 108. Specifically, before the to-be-tested sample 109 is placed on the movement device (i.e., placed between the light emitter 114 and the test backplane 108), the light emitter 114 may directly emit light onto the test backplane 108, and the light emitter 114 may adjust the optical path to make the emitted light travel to the center point A0 of the test backplane 108. In this case, the adjusted optical path is the first optical path 111, and in the case where the light emitter 114 emits light along the first optical path 111 towards the test backplane 108, the center point A0 can be displayed on the test backplane 108 (e.g., the center point A0 may be displayed as a brightness spot). Then, after the to-be-tested sample 109 is placed on the movement device of the test backplane 108, since the to-be-tested sample 109 is located at the side of the test backplane 108 proximal to the light emitter 114, the to-be-tested sample 109 blocks the light emitted from the light emitter 114 towards the test backplane 108. Therefore, the light emitted from the light emitter 114 will display the first center point A on the to-be-tested sample 109, and a projection of the first center point A along the direction of the first optical path 111 on the test backplane 108 coincides with the center point A0 (i.e., both at the same position). Thus, it can be said that the first center point A of the to-be-tested sample 109 corresponds to the center point A0 of the test backplane 108. A schematic diagram showing the first center point A and the second center point B on the to-be-tested sample 109 can be referred to the FIG. 3 to be described below. In an embodiment, when the to-be-tested sample 109 is a transparent display panel, the first center point A is displayed not only on the to-be-tested sample 109 but also on the test backplane 108 (e.g., displayed at the center point A0 of the test backplane 108). In the optical measurement device of FIG. 1, the center point A0 of the test backplane 108, the first center point A, and the first optical path 111 are located on a straight line. In an embodiment, in the case where the optical measurement device of FIG. 1 is placed horizontally, the center point A0 of the test backplane 108, the first center point A, and the first optical path 111 are on a horizontal straight line. In the present embodiment, the center point A0 of the test backplane 108, which may function as a fixing device, is kept stationary, so that the first center point A formed by the light transmitted to the center point A0 of the test backplane 108 is also kept stationary. It should be noted that, the first optical path 111 shown in FIG. 1 may be a virtual line. When the first center point A and the second center point B displayed on the to-be-tested sample 109 coincide with each other, an alignment operation for aligning the to-be-tested sample 109 with the center point of the test backplane 108 is completed, i.e., a position for placing the to-be-tested sample 109 on the test backplane 108 is determined. Thereafter, the to-be-tested sample 109 may be attached to the test backplane 108. Further, during a subsequent optical test, the test backplane 108 may rotate in a vertical plane by taking the first optical path 111 as a rotation axis as needed, to drive the to-be-tested sample 109 to rotate in a vertical plane by taking the first optical path 111 as a rotation axis. In an embodiment, an angle by which the test backplane 108 rotates in the vertical plane by taking the first optical path 111 as a rotation axis may ranges from 0 degrees to 360 degrees.

In an embodiment, the light emitter 114 may be a laser, and the light emitted from the light emitter 114 is a laser beam. The laser beam may be a visible light beam, and the first center point A may be a brightness spot.

In the present embodiment, the center point detector 112 may be configured to detect size information of the to-be-tested sample 109, calculate position information of the second center point B according to the size information, and emit light to the to-be-tested sample 109 to display the second center point B on the to-be-tested sample 109, according to the position information of the second center point B.

In the present embodiment, the center point detector 112 emits light along the second optical path 110, to detect and display the second center point B of the to-be-tested sample 109. The center point detector 112 may calculate the position information of the second center point B of the to-be-tested sample 109 by ultrasonic and optical measurement methods. In an embodiment, the center point detector 112 may include a laser, the light emitted from the center point detector 112 may be a laser beam (e.g., a visible light beam), and the second center point B may be a brightness spot. In an embodiment, the center point detector 112 may be an optical sensor for implementing the above described functions of the center point detector 112, In an embodiment, in addition to the optical sensor, the center point detector 112 may further include a calculator, a microprocessor, a controller, or the like, for calculating the position information of the second center point B according to the size information obtained by the optical sensor, and for controlling the optical sensor to emit light to the to-be-tested sample 109 so as to display the second center point B on the to-be-tested sample 109 according to the position information of the second center point B.

Figure 2:
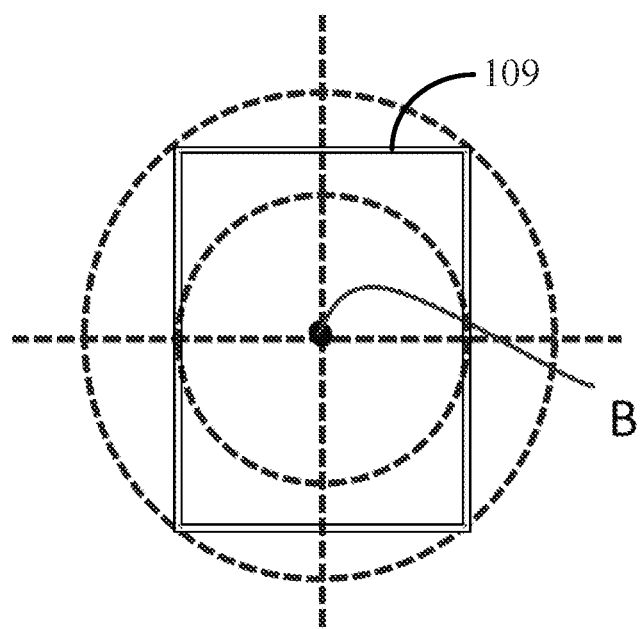
FIG. 2 is a schematic diagram showing detection of a center point of the to-be-tested sample shown in FIG. 1.

FIG. 2 is a schematic diagram showing detection of a center point of the to-be-tested sample shown in FIG. 1. As shown in FIGS. 1 and 2, the center point detector 112 may be configured to detect the size information of the to-be-tested sample 109. For example, in a case where the to-be-tested sample 109 is of a rectangular structure, the size information of the to-be-tested sample 109 may include a length and a width of the to-be-tested sample 109. In other words, the center point detector 112 may detect the length and the width of the to-be-tested sample 109 by emitting light towards edges of the to-be-tested sample 109, and then calculate a large circle (e.g., the outer circle shown in FIG. 2) passing through four vertices of the to-be-tested sample 109 based on the length and the width of the to-be-tested sample 109, The large circle has a diameter which is the length of a diagonal of the to-be-tested sample 109. Then, the center of the large circle is determined. The position of the center of the large circle is the position of the second center point B of the to-be-tested sample 109.

Alternatively, the center point detector 112 may detect the size information of the to-be-tested sample 109, and in the case where the to-be-tested sample 109 is of a rectangular structure, the size information thereof may include a width of the to-be-tested sample 109 (i.e., a size of the shorter side of two adjacent sides of the to-be-tested sample 109). In other words, the center point detector 112 detects the width of the to-be-tested sample 109 by emitting light towards an edge of the to-be-tested sample 109. The center point detector 112 may calculate a small circle (e.g., the inner circle shown in FIG. 2) inscribed in the to-be-tested sample 109 based only on the width of the to-be-tested sample 109, and the small circle passes through midpoints of the two longer sides of the to-be-tested sample 109. Then the center of the small circle is determined. The position of the center of the small circle is the position of the second center point B of the to-be-tested sample 109.

The center point detector 112 can perform the above described processes of detecting the size information of the to-be-tested sample 109, calculating the large circle to determine the center of the large circle or calculating the small circle to determine the center of the small circle, and determining the position of the second center point B of the to-be-tested sample 109, such that the second center point B displayed on the to-be-tested sample 109 is always at the actual center point (e.g., the actual geometric center point) of the to-be-tested sample 109.

In an embodiment, the optical measurement device may further include a vacuum suction device (e.g., a suction cup) (not shown in FIG. 1) provided on the test backplane 108. For example, the vacuum suction device may be provided on a side of the test backplane 108 proximal to the center point detector 112 and the light emitter 114. The vacuum suction device is configured to, after the first center point A and the second center point B coincide with each other, adsorb and fix the to-be-tested sample 109 to the test backplane 108. In a case where the to-be-tested sample 109 is fixed by only a clamp, the fixing may be too loose so that the to-be-tested sample 109 is shakeable and unstable or the fixing may be too tight so that the to-be-tested sample 109 may deform, thereby resulting in the problems of LO light leakage and screen breakage. In the present disclosure, the symbol "LO" refers to a pure black picture. In the present embodiment, the vacuum suction device is employed to adsorb and fix the to-be-tested sample 109 to the test backplane 108, thereby making a test result of the to-be-tested sample 109 more accurate. The vacuum suction device is employed to adsorb the to-be-tested sample 109, and can be better applied to the to-be-tested sample 109 which is light and thin, such as a light and thin liquid crystal display panel.

In an embodiment, the optical measurement device is further provided with a fixing device (e.g., a clamp) for assisting the vacuum suction device to achieve double fixing of the to-be-tested sample 109. The fixing device may be provided on the test backplane 108. In a case where the vacuum suction device is weak or fails due to its own structural reasons or environmental reasons, the fixing device may further fix the to-be-tested sample 109 to the test backplane 108, ensuring that the to-be-tested sample 109 is safely fixed.

Figure 3:
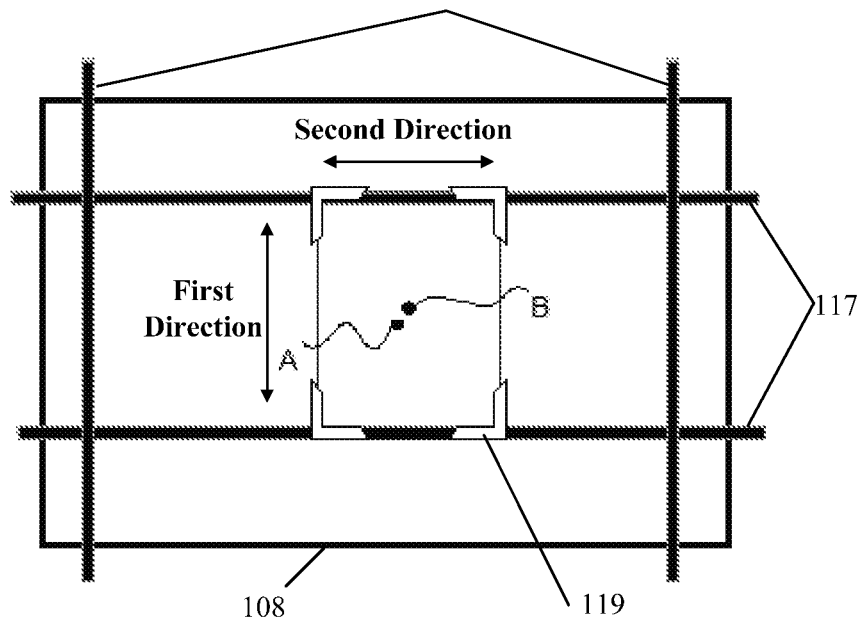
FIG. 3 is a schematic diagram showing a structure of a movement device of the optical measurement device shown in FIG. 1.

FIG. 3 is a schematic diagram showing a structure of the movement device of the optical measurement device shown in FIG. 1. As shown in FIG. 3, the movement device includes first supports 117 and second supports 118. The to-be-tested sample 109 is provided on the first supports 117, and the first supports 117 are provided on the second supports 118. The first supports 117 are configured to move in a second direction to drive the to-be-tested sample 109 to move in the second direction. The second supports 118 are configured to move in a first direction to drive the first supports 117 to move in the first direction, so as to drive the to-be-tested sample 109 to move in the first direction, the first direction and the second direction being arranged to cross each other. In an embodiment, as shown in FIG. 3, the first direction is parallel to the second supports 118, and the second direction is parallel to the first supports 117.

In the present embodiment, the first supports 117 are arranged horizontally, and thus are horizontal supports. The second supports 118 are arranged vertically, and thus the second supports 118 are vertical supports. The first direction is the vertical direction, the second direction is the horizontal direction, and the first direction and the second direction may be perpendicular to each other. In an embodiment, as shown in FIG. 3, the first direction is perpendicular to first supports 117, and the second direction is perpendicular to the second supports 118.

In the present embodiment, the number (i.e., quantity) of the first supports 117 is two, and the two first supports 117 are arranged parallel to each other. The number of the second supports 118 is two, and the two second supports 118 are arranged parallel to each other. The first supports 117 and the second supports 118 are arranged to cross each other. In an embodiment, the first supports 117 and the second supports 118 are arranged perpendicular to each other.

In an embodiment, the optical measurement device may further include four fixing structures 119, two of the four fixing structures 119 are provided on one of the first supports 117, and the remaining two of the four fixing structures 119 are provided on the other of the first supports 117. Each of the four fixing structures 119 may be an L-shaped bending structure having a bending angle matching with a corresponding contour or corner of the to-be-tested sample 109, e.g., the bending angle may be 90 degrees. Each of corner portions of the to-be-tested sample 109 is located on a corresponding fixing structure 119, such that the to-be-tested sample 109 is arranged on the first supports 117. Specifically, each of the corner portions of the to-be-tested sample 109 may be engaged in the corresponding fixing structure 119, such that the to-be-tested sample 109 is arranged on the first supports 117.

In the present embodiment, a distance between the two fixing structures 119 located on each of the first supports 117 may be set according to a size of the to-be-tested sample 109. As shown in FIG. 3, the distance between the two fixing structures 119 located on each of the first supports 117 may be adjusted according to the width of the to-be-tested sample 109. For example, the distance between the two fixing structures 119 on each first support 117 may be increased such that a to-be-tested sample 109 having a larger width may be arranged on the first supports 117. Similarly, a to-be-tested sample 109 having a smaller width may be arranged on the first supports 117. In the present embodiment, the distance between the two first supports 117 is set according to a size of the to-be-tested sample. For example, the second direction may be the width direction of the to-be-tested sample 109.

As shown in FIG. 3, the distance between the two first supports 117 may be adjusted according to the length of the to-be-tested sample 109. For example, the distance between the two first supports 117 may be increased such that a to-be-tested sample having a larger length may be arranged on the first supports 117. Similarly, a to-be-tested sample 109 having a smaller length may be arranged on the first supports 117. For example, the first direction may be the length direction of the to-be-tested sample 109. As described above, the present embodiment enables the first supports 117 to be able to hold products having different sizes by adjusting the distance between the two first supports 117 and the distance between the two fixing structures 119 located on each of the first supports 117. The optical measurement device according to the present embodiment is suitable for measuring products having various sizes, for example, is suitable for measuring products having a smaller size, such as a to-be-tested sample having a size less than 12.5 inches.

In the present embodiment, as shown in FIG. 3, by moving the first supports 117, the to-be-tested sample 109 may be driven to move left and right in the second direction. By moving the second supports 118, the to-be-tested sample 109 may be driven to move up and down in the first direction. For example, as shown in FIG. 3, in a case where the second center point B of the to-be-tested sample 109 is located at the upper right of the first center point A, the to-be-tested sample 109 may be moved left and downward such that the second center point B coincides with the first center point A, thereby completing the operation for aligning the to-be-tested sample 109 with the test backplane 108.

In an embodiment, the second supports 118 may be provided with first slide rails (not shown) thereon, respectively, and the first supports 117 may be arranged in the first slide rails, respectively, and move in the second direction through the first slide rails, to drive the to-be-tested sample 109 to move in the second direction.

In an embodiment, the test backplane 108 may be provided with second slide rails (not shown) thereon, and the second supports 118 may be arranged in the second slide rails, respectively, and move in the first direction through the second slide rails, to drive the to-be-tested sample 109 to move in the first direction.

In the present embodiment, the first supports 117 and the second supports 118 may be driven to move manually or automatically, such that the second center point B coincides with the first center point A. In a case where the first supports 117 and the second supports 118 are driven by an automatic control mode, the optical measurement device may further include a driving mechanism (not shown) for driving the first supports 117 to move in the second direction and for driving the second supports 118 to move in the first direction. For example, the drive mechanism may be a drive motor.

In an embodiment, as shown in FIG. 1, the optical measurement device may further include a test instrument 113 and a test-instrument support 115. The light emitter 114 may be located within the test instrument 113, and the center point detector 112 may be located on the test instrument 113. The test instrument 113 may be located on test-instrument support 115. The test instrument 113 may be an optical measurement instrument including at least one of a spectrum analyzer, a luminance meter, an illuminometer, a photometer, a color temperature meter, and a color analyzer. In an embodiment, depending on the kind and the number of optical parameters to be tested, the optical measurement instrument may include two or more of the spectrum analyzer, the luminance meter, the illuminometer, the photometer, the color temperature meter, and the color analyzer.

In the embodiment, the test instrument 113 is further configured to perform an optical test on the to-be-tested sample 109 to obtain various optical parameters of the to-be-tested sample 109. For example, the optical parameters may include a viewing angle, a color shift, and/or other similar optical parameters. As described above, the to-be-tested sample 109 is located on the side of the test backplane 108 proximal to the test-instrument support 115. In other words, the to-be-tested sample 109 is located between the test-instrument support 115 and the test backplane 108.

In the present embodiment, as shown in FIG. 1, the optical measurement device may further include a bottom turnplate 101 and an equipment support. The equipment support is provided on the bottom turnplate 101, and the test backplane 108 is provided on the equipment support. The bottom turnplate 101 may be rotated in a horizontal plane around a rotation axis 116 shown in FIG. 1. The bottom turnplate 101 is rotated to drive the test backplane 108 to rotate in the horizontal plane. Specifically, the bottom turnplate 101 is rotated around the rotation axis 116 to drive the test backplane 108 to rotate, and both a center point of the bottom turnplate 101 and the center point A0 of the test backplane 108 are located on the rotation axis 116.

As shown in FIG. 1, the equipment support may include a first test-backplane support 102, a second test-backplane support 103, a third test-backplane support 104, and a fourth test-backplane support 105. The first test-backplane support 102, the second test-backplane support 103, the third test-backplane support 104, and the fourth test-backplane support 105 are sequentially connected to each other, to form the equipment support for supporting the test backplane 108. The first test-backplane support 102 and the second test-backplane support 103 are connected to the bottom turnplate 101. The first test-backplane support 102 is provided on the bottom turnplate 101, and the second test-backplane support 103 is also provided on the bottom turnplate 101. The second test-backplane support 103 is further connected to the first test-backplane support 102, and a portion of the second test-backplane support 103 is fixed to the first test-backplane support 102, such that the first test-backplane support 102 may take the role of fixing the third test-backplane support 103 to a certain degree. Specifically, the first test-backplane support 102 may be of a triangular structure to improve the stability of fixing and supporting the second test-backplane support 103. The second test-backplane support 103 is connected to the third test-backplane support 104, and the third test-backplane support 104 is connected to the fourth test-backplane support 105. The third test-backplane support 104 is arranged on the second test-backplane support 103, and the fourth test-backplane support 105 is arranged on the third test-backplane support 104. As shown in FIG. 1, the fourth test-backplane support 105 and the first optical path 111 may be located on the same straight line. Each of the fourth test-backplane support 105 and the first optical path 111 may be perpendicular to the rotation axis 116. The third test-backplane support 104 functions as a connector for connecting the second test-backplane support 103 to the fourth test-backplane support 105. An end of the fourth test-backplane support 105 is arranged on the third test-backplane support 104 such that the test backplane 108 may be rotated in the vertical plane around the fourth test-backplane support 105, and another end of the fourth test-backplane support 105 extends towards the test backplane 108. The test backplane 108 is arranged on the another end of the fourth test-backplane support 105.

In an embodiment, the optical measurement device may further include a test-backplane turnplate 106 provided between the test backplane 108 and the fourth test-backplane support 105. Specifically, the test-backplane turnplate 106 may be provided on the fourth test-backplane support 105, and the test backplane 108 may be arranged on the test-backplane turnplate 106. The test-backplane turnplate 106 may rotate in a vertical plane by taking the first optical path 111 or the fourth test-backplane support 105 as a rotation axis, to drive the test backplane 108 to rotate in a vertical direction by taking the first optical path 111 or the fourth test-backplane support 105 as a rotation axis, thereby driving the to-be-tested sample 109 to rotate in a vertical plane by taking the first optical path 111 or the fourth test-backplane support 105 as a rotation axis.

In an embodiment, the optical measurement device may further include a test-backplane fixing device (e.g., a clamp, a fastener, etc.) 107, an end of the test-backplane fixing device 107 is arranged on a side of the test backplane 108 distal to the to-be-tested sample 109, and another end of the test-backplane fixing device 107 is arranged on the test-backplane turnplate 106. In other words, the test-backplane fixing device 107 is a fixing device fixed to the test backplane 108 and the test-backplane turnplate 106, and is configured to fix the test backplane 108 to prevent the test backplane 108 from randomly and relatively sliding or swinging during the process that the test backplane 108 is rotated with the test-backplane turnplate 106.

In a case where an optical test is performed on the to-be-tested sample 109, the bottom turnplate 101 may rotate in the horizontal plane by taking the rotation axis 116 as the rotation axis, and the test backplane 108 is driven to rotate through the equipment support, thereby driving the to-be-tested sample 109 to rotate. The center point of the bottom turnplate 101 and the center point A0 of the test backplane 108 are located on the same vertical line during rotation, and the vertical line is the rotation axis 116, which is shown as a virtual line in FIG. 1. In an embodiment, the bottom turnplate 101 may rotate counterclockwise or clockwise within the horizontal plane, and may rotate by an angle ranging from −85° to 85°. Further, the test backplane 108 may rotate in the vertical plane by taking the first optical path 111 as the rotation axis, to drive the to-be-tested sample 109 to rotate. Once the to-be-tested sample 109 rotates to a specified angle, pictures of the to-be-tested sample 109 are switched by a computer software, and data is corrected by the test instrument 113, such that optical parameters, such as a viewing angle, a color shift, and the like, from different angles such as up, down, left, right, and other desired directions are detected.

In the optical measurement device according to the present embodiment, the light emitter displays the first center point on the to-be-tested sample, and the first center point corresponds to the center point of the test backplane. The center point detector detects the second center point and displays the second center point on the to-be-tested sample, and the second center point is the center point of the to-be-tested sample. The movement device moves the to-be-tested sample to make the first center point and the second center point coincide with each other. The optical measurement device according to the embodiment can achieve accurate coincidence of the center points of the to-be-tested sample and the test backplane, and effectively reduce an error of the results of an optical test, thereby increasing the accuracy of the results of the optical test. The solution of the present embodiment can determine the first center point and the second center point quickly, and make the center points of the to-be-tested sample and the test backplane coincide with each other quickly, thereby improving the test efficiency.

Figure 4:
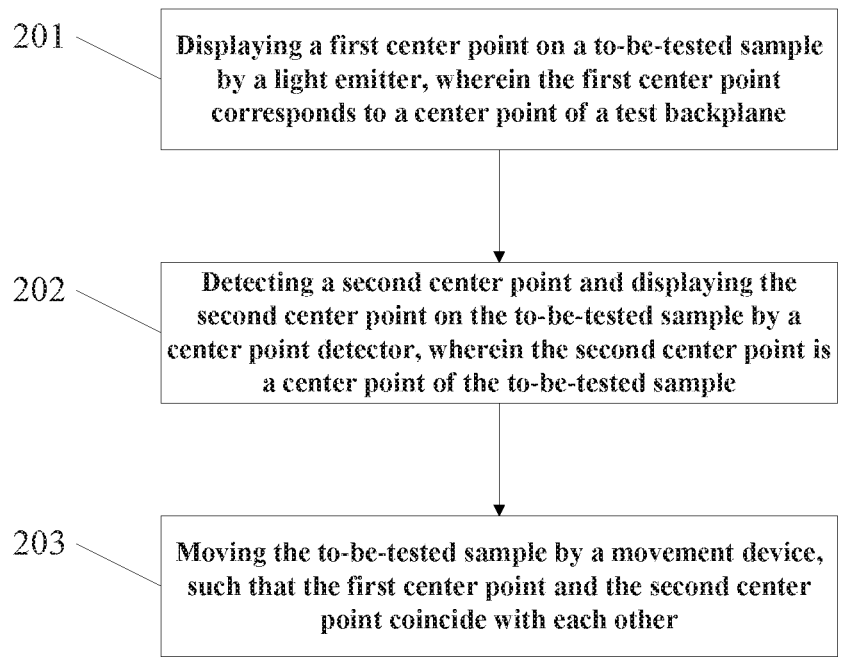
FIG. 4 is a schematic flowchart of an optical measurement method according to an embodiment of the present disclosure.

FIG. 4 is a schematic flowchart of an optical measurement method according to an embodiment of the present disclosure. As shown in FIG. 4, the optical measurement method may include the following steps 201 to 203.

At the step 201, the first center point is displayed on the to-be-tested sample by the light emitter, wherein the first center point corresponds to the center point of the test backplane.

At the step 202, the second center point is detected and displayed on the to-be-tested sample by the center point detector, wherein the second center point is the center point of the to-be-tested sample.

In an embodiment, the step 202 may include the following steps 2021 to 2023.

At the step 2021, size information of the to-be-tested sample is detected by using the center point detector.

At the step 2022, position information of the second center point is calculated, by using the center point detector, according to the size information.

At the step 2023, light is emitted from the center point detector to the to-be-tested sample to display the second center point on the to-be-tested sample, according to the position information of the second center point.

At the step 203, the to-be-tested sample is moved by the movement device, such that the first center point and the second center point coincide with each other.

The optical measurement method provided by the present embodiment may be carried out by the optical measurement device provided by any one of the foregoing embodiments.

In the optical measurement method according to the present embodiment, the light emitter displays the first center point on the to-be-tested sample, and the first center point corresponds to the center point of the test backplane. The center point detector detects the second center point and displays the second center point on the to-be-tested sample, and the second center point is the center point of the to-be-tested sample. The movement device moves the to-be-tested sample to make the first center point and the second center point coincide with each other. The optical measurement method according to the embodiment can achieve accurate coincidence of the center points of the to-be-tested sample and the test backplane, and effectively reduce an error of the results of an optical test, thereby increasing the accuracy of the results of the optical test. The optical measurement method of the present embodiment can determine the first center point and the second center point quickly, and make the center points of the to-be-tested sample and the test backplane coincide with each other quickly, thereby improving the test efficiency.

Figure 5:
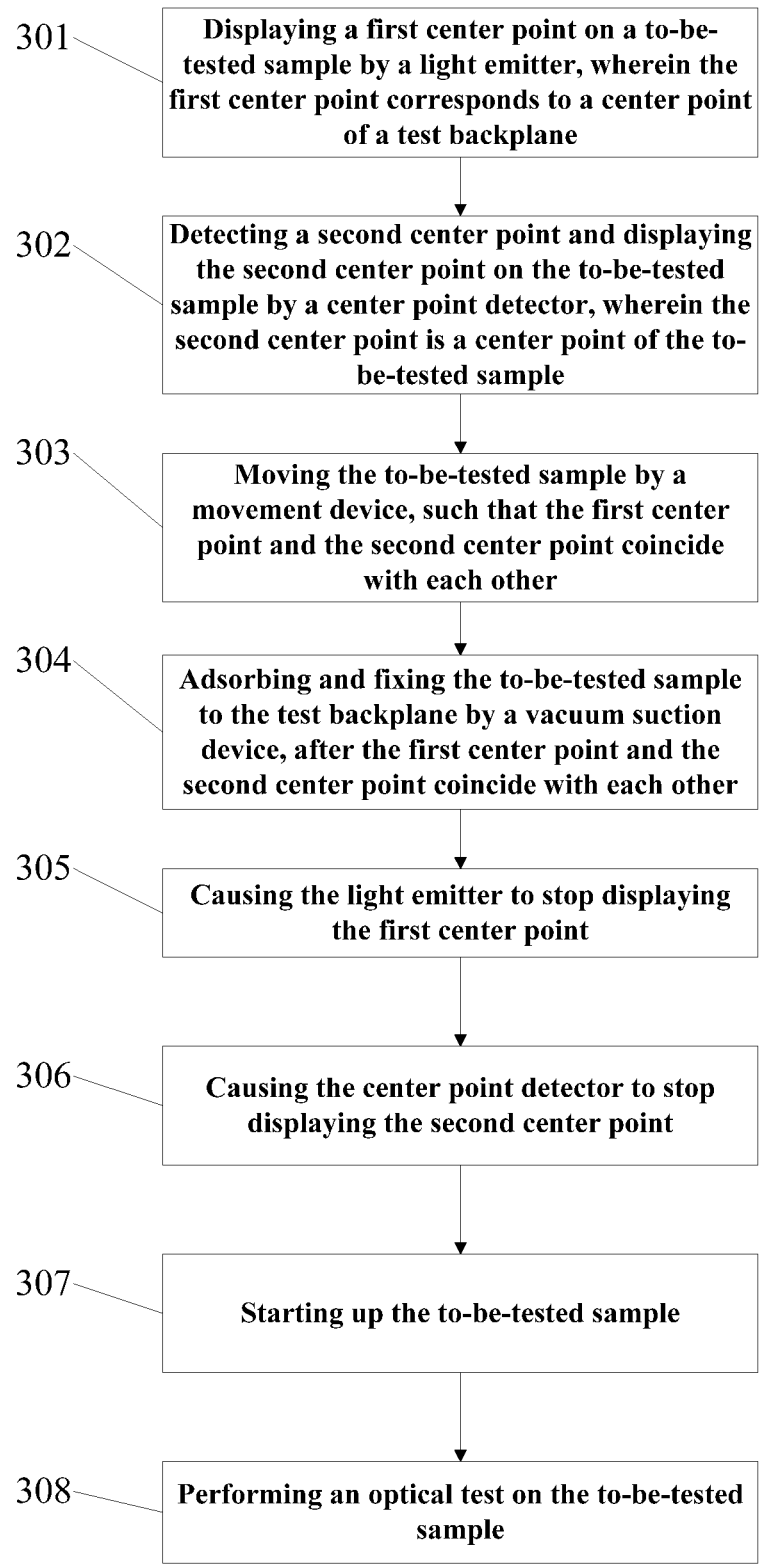
FIG. 5 is a schematic flowchart of another optical measurement method according to an embodiment of the present disclosure.

FIG. 5 is a schematic flowchart of another optical measurement method according to an embodiment of the present disclosure. As shown in FIG. 5, the optical measurement method may include the following steps 301 to 308.

At the step 301, the first center point is displayed on the to-be-tested sample by the light emitter, wherein the first center point corresponds to the center point of the test backplane.

At the step 302, the second center point is detected and displayed on the to-be-tested sample by the center point detector, wherein the second center point is the center point of the to-be-tested sample.

At the step 303, the to-be-tested sample is moved by the movement device, such that the first center point and the second center point coincide with each other.

After the steps 301 to 303 are completed, the optical measurement method achieves a coincidence operation (or an alignment operation) for making the center points of the to-be-tested sample and the test backplane coincide with each other, i.e., a position for placing the to-be-tested sample on the test backplane is determined. Thereafter, the to-be-tested sample may be fixed to the test backplane, for performing an optical test.

At the step 304, after the first center point and the second center point are caused to coincide with each other, the to-be-tested sample is adsorbed and fixed to the test backplane by the vacuum suction device.

At the step 305, the light emitter is caused to stop displaying the first center point.

At the step 306, the center point detector is caused to stop displaying the second center point.

After the coincidence operation for making the center points of the to-be-tested sample and the test backplane coincide with each other, it is no longer necessary to display the first center point and the second center point, to avoid the brightness spots from having an influence on a subsequent optical test. Thus, displaying of the first center point and the second center point is stopped. In the present embodiment, the steps 305 and 306 may be performed sequentially or simultaneously. Alternatively, the step 306 may be performed first and then the step 305 is performed.

At the step 307, the to-be-tested sample is started up.

For example, the step of starting up the to-be-tested sample may include turning on a switch of the to-be-tested sample or starting up the to-be-tested sample, such that the to-be-tested sample operates and displays an initial screen.

At the step 308, an optical test is performed on the to-be-tested sample. The optical test may include test items for testing optical parameters such as a viewing angle, a color shift, and the like. At this time, the to-be-tested sample is adsorbed and fixed to the test backplane, and an accurate optical test on the to-be-tested sample is realized by adjusting a position and an angle of the test backplane and the to-be-tested sample as described above.

In an embodiment, in a case where an optical test is performed on the to-be-tested sample, the bottom turnplate may rotate in the horizontal plane by taking the axis of rotation as the rotation axis, and the test backplane is driven to rotate through the equipment support, thereby driving the to-be-tested sample to rotate in the horizontal plane. The center point of the bottom turnplate and the center point of the test backplane are located on the same vertical line during rotation, and the vertical line is the rotation axis, which may be a virtual line. In an embodiment, the bottom turnplate may rotate by an angle ranging from −85° to 85°. Further, the test backplane may rotate in the vertical plane by taking the first optical path or the fourth test-backplane support 105 as the rotation axis, to drive the to-be-tested sample to rotate in the vertical plane. Once the to-be-tested sample rotates to a specified angle, pictures of the to-be-tested sample are switched by a computer software, and data is corrected by the test instrument, such that optical parameters, such as a viewing angle, a color shift, and the like, from different angles such as up, down, left, right, and other desired directions are detected.

The optical measurement method provided by the present embodiment may be carried out by the optical measurement device provided by any one of the foregoing embodiments.

In the optical measurement method according to the present embodiment, the light emitter displays the first center point on the to-be-tested sample, and the first center point corresponds to the center point of the test backplane. The center point detector detects the second center point and displays the second center point on the to-be-tested sample, and the second center point is the center point of the to-be-tested sample. The movement device moves the to-be-tested sample to make the first center point and the second center point coincide with each other. The optical measurement method according to the embodiment can achieve accurate coincidence of the center points of the to-be-tested sample and the test backplane, and effectively reduce an error of the results of an optical test, thereby increasing the accuracy of the results of the optical test. The optical measurement method of the present embodiment can determine the first center point and the second center point quickly, and make the center points of the to-be-tested sample and the test backplane coincide with each other quickly, thereby improving the test efficiency.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. An optical measurement device, comprising a test backplane, a light emitter, a center point detector and a movement device, wherein
    the movement device is provided on the test backplane, and configured to carry a to-be-tested sample;
    the light emitter is configured to display a first center point on the to-be-tested sample, and the first center point corresponds to a center point of the test backplane;
    the center point detector is configured to detect a second center point and display the second center point on the to-be-tested sample, and the second center point is a center point of the to-be-tested sample; and
    the movement device is further configured to move the to-be-tested sample, such that the first center point and the second center point coincide with each other.

2. The optical measurement device according to claim 1, wherein the center point detector is configured to detect size information of the to-be-tested sample, calculate position information of the second center point according to the size information, and emit light towards the to-be-tested sample according to the position information of the second center point, so as to display the second center point on the to-be-tested sample.

3. The optical measurement device according to claim 1, further comprising a vacuum suction device provided on the test backplane, wherein
    the vacuum suction device is configured to, after the first center point and the second center point coincide with each other, adsorb and fix the to-be-tested sample to the test backplane.

4. The optical measurement device according to claim 1, wherein the movement device comprises first supports and second supports, the to-be-tested sample is provided on the first supports, and the first supports are provided on the second supports;
    the first supports are configured to move in a second direction, so as to drive the to-be-tested sample to move in the second direction; and
    the second supports are configured to move in a first direction, so as to drive the first supports to move in the first direction, such that the to-be-tested sample is moved in the first direction, the first direction and the second direction being arranged to cross each other.

5. The optical measurement device according to claim 4, wherein a number of the first supports is two, and the two first supports are arranged parallel to each other.

6. The optical measurement device according to claim 5, wherein a distance between the two first supports is set according to a size of the to-be-tested sample.

7. The optical measurement device according to claim 4, further comprising four fixing structures, wherein two of the four fixing structures are provided on one of the first supports, and the remaining two of the four fixing structures are provided on the other of the first supports; and
    each corner portion of the to-be-tested sample is arranged on a corresponding one of the fixing structures, such that the to-be-tested sample is arranged on the first supports.

8. The optical measurement device according to claim 7, wherein a distance between two fixing structures on each of the first supports is set according to a size of the to-be-tested sample.

9. The optical measurement device according to claim 7, wherein each of the fixing structures is of an L-shaped bending structure, which has a contour matching with that of a corresponding corner portion of the to-be-tested sample.

10. The optical measurement device according to claim 4, wherein a number of the second supports is two, and the two second supports are arranged parallel to each other.

11. The optical measurement device according to claim 1, further comprising a test instrument and a test-instrument support, wherein
the light emitter is located inside the test instrument, and the center point detector is located on the test instrument; and
the test instrument is located on the test-instrument support.

12. The optical measurement device according to claim 11, wherein the test instrument is configured to perform an optical test on the to-be-tested sample to obtain optical parameters of the to-be-tested sample.

13. The optical measurement device according to claim 1, further comprising a bottom turnplate and an equipment support, wherein
the test backplane is provided on the equipment support, and the equipment support is provided on the bottom turnplate; and
the bottom turnplate is configured to rotate in a horizontal plane around a rotation axis, to drive the test backplane to rotate in the horizontal plane, and both a center point of the bottom turnplate and the center point of the test backplane are located on the rotation axis.

14. The optical measurement device according to claim 13, wherein the equipment support comprises a first test-backplane support, a second test-backplane support, a third test-backplane support and a fourth test-backplane support which are connected to each other sequentially, wherein
the fourth test-backplane support is perpendicular to the rotation axis; and
the test backplane is configured to rotate in a vertical plane to drive the to-be-tested sample to rotate in the vertical plane.

15. The optical measurement device according to claim 14, further comprising a test-backplane turnplate, wherein
the test-backplane turnplate is provided between the test backplane and the fourth test-backplane support; and
the test-backplane turnplate is configured to rotate in the vertical plane by taking the fourth test-backplane support as a rotation axis, to drive the test backplane to rotate in the vertical plane by taking the fourth test-backplane support as a rotation axis.

16. The optical measurement device according to claim 15, further comprising a test-backplane fixing device, wherein
an end of the test-backplane fixing device is arranged at a side of the test backplane distal to the to-be-tested sample, and another end of the test-backplane fixing device is arranged on the test-backplane turnplate; and
the test-backplane fixing device is configured to fix the test backplane, to prevent the test backplane from sliding or swinging relative to the test-backplane turnplate.

17. An optical measurement method, comprising steps of:
displaying a first center point on a to-be-tested sample by a light emitter, wherein the first center point corresponds to a center point of a test backplane;
detecting a second center point and displaying the second center point on the to-be-tested sample by a center point detector, wherein the second center point is a center point of the to-be-tested sample; and
moving the to-be-tested sample by a movement device, such that the first center point and the second center point coincide with each other.

18. The optical measurement method according to claim 17, wherein the step of detecting a second center point and displaying the second center point on the to-be-tested sample by a center point detector comprises steps of:
detecting size information of the to-be-tested sample by the center point detector;
calculating position information of the second center point, by the center point detector, according to the size information; and
emitting light towards the to-be-tested sample by the center point detector according to the position information of the second center point, so as to display the second center point on the to-be-tested sample.

19. The optical measurement method according to claim 17, further comprising a step of:
after the step of moving the to-be-tested sample by a movement device such that the first center point and the second center point coincide with each other, adsorbing and fixing the to-be-tested sample to the test backplane by a vacuum suction device.

20. The optical measurement method according to claim 19, further comprising, after the step of adsorbing and fixing the to-be-tested sample to the test backplane by a vacuum suction device, steps of:
causing the light emitter to stop displaying the first center point;
causing the center point detector to stop displaying the second center point;
starting up the to-be-tested sample; and
performing an optical test on the to-be-tested sample.

* * * * *